(12) United States Patent
Izumi et al.

(10) Patent No.: US 11,772,222 B2
(45) Date of Patent: Oct. 3, 2023

(54) MACHINE TOOL SYSTEM

(71) Applicant: FANUC CORPORATION, Yamanashi (JP)

(72) Inventors: Hitoshi Izumi, Yamanashi (JP); Kenichiro Kurihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 598 days.

(21) Appl. No.: 16/940,646

(22) Filed: Jul. 28, 2020

(65) Prior Publication Data
US 2021/0039217 A1 Feb. 11, 2021

(30) Foreign Application Priority Data
Aug. 7, 2019 (JP) .................... 2019-145140

(51) Int. Cl.
*B23Q 17/09* (2006.01)
*G05B 19/404* (2006.01)

(52) U.S. Cl.
CPC ....... B23Q 17/0985 (2013.01); G05B 19/404 (2013.01); *B23Q 2717/00* (2013.01); *G05B 2219/37428* (2013.01); *G05B 2219/49102* (2013.01)

(58) Field of Classification Search
CPC ............ B23Q 17/0985; B23Q 2717/00; B23Q 11/0007; G05B 19/404; G05B 2219/37428; G05B 2219/49102
See application file for complete search history.

(56) References Cited

U.S. PATENT DOCUMENTS

| | | | |
|---|---|---|---|
| 5,895,181 A * | 4/1999 | Ito ................. | B23Q 23/00 409/149 |
| 6,456,896 B1 | 9/2002 | Ito et al. | |
| 2002/0038189 A1* | 3/2002 | Mizuguchi ........... | B23Q 15/18 702/94 |
| 2016/0299522 A1* | 10/2016 | Jones ................. | G05B 15/02 |
| 2017/0177051 A1* | 6/2017 | Ferentz ............... | G06F 1/266 |

FOREIGN PATENT DOCUMENTS

| | | |
|---|---|---|
| EP | 0 878 267 A1 | 11/1998 |
| JP | S50127076 A | 10/1975 |
| JP | H10-138091 A | 5/1998 |
| JP | 2001269840 A | 10/2001 |
| JP | 2008119808 A | 5/2008 |
| JP | 2018132318 A | 8/2018 |
| JP | 2019-053414 A | 4/2019 |

* cited by examiner

*Primary Examiner* — Thomas C Lee
*Assistant Examiner* — Tyler Dean Hedrick
(74) *Attorney, Agent, or Firm* — Maier & Maier, PLLC

(57) ABSTRACT

A machine tool system is equipped with a machine tool and a controller. The machine tool is equipped with a machine tool body and at least one temperature sensor that acquires temperature data of the machine tool body. The controller is equipped with a storage that stores the temperature data acquired in time-series by the temperature sensor, and an auxiliary power supply that supplies power to the temperature sensor and the storage when the supply of power to the machine tool body is stopped. The controller controls the machine tool by using the temperature data over a predetermined time range stored in the storage, and selects, in response to a charge state of the auxiliary power supply, the temperature data to be used in first control after the supply of power to the machine tool body is resumed.

3 Claims, 8 Drawing Sheets

MACHINE TOOL SYSTEM

CROSS-REFERENCE TO RELATED APPLICATIONS

This application is based on and claims priority to Japanese Patent Application No. 2019-145140 filed on Aug. 7, 2019, the entire content of which is incorporated herein by reference.

FIELD

The present disclosure relates to a machine tool system.

BACKGROUND

There is a known thermal displacement compensation method for a machine tool, the method including switching the positional compensation value, which is used to compensate thermal-displacement-induced positional displacement of a feed screw or the like of the machine tool, according to the shutdown time (for example, see Japanese Unexamined Patent Application, Publication No. H10-138091).

According to Japanese Unexamined Patent Application, Publication No. H10-138091, since thermal displacement still remains in a feed screw or the like when the shutdown time is shorter than a set time, the time at which the power is turned off and the compensation value are stored, and the compensation value is calculated by approximation when the power is turned on again. Meanwhile, when the shutdown time is longer than the set time, the positional compensation value is totally cleared to zero since it is considered that thermal displacement no longer remains.

SUMMARY

An aspect of the present disclosure provides a machine tool system that includes a machine tool and a controller, in which the machine tool is equipped with a machine tool body and at least one temperature sensor that acquires temperature data of the machine tool body, the controller is equipped with a storage that stores the temperature data acquired in time-series by the temperature sensor, and an auxiliary power supply that supplies power to the temperature sensor and the storage when supply of power to the machine tool body is stopped, and the controller controls the machine tool by using the temperature data over a predetermined time range stored in the storage, and selects, in response to a charge state of the auxiliary power supply, the temperature data to be used in first control after power supply to the machine tool body is resumed.

DETAILED DESCRIPTION OF EMBODIMENTS

A machine tool system 1 according to an embodiment of the present disclosure will now be described with reference to the drawings.

Figure 1:
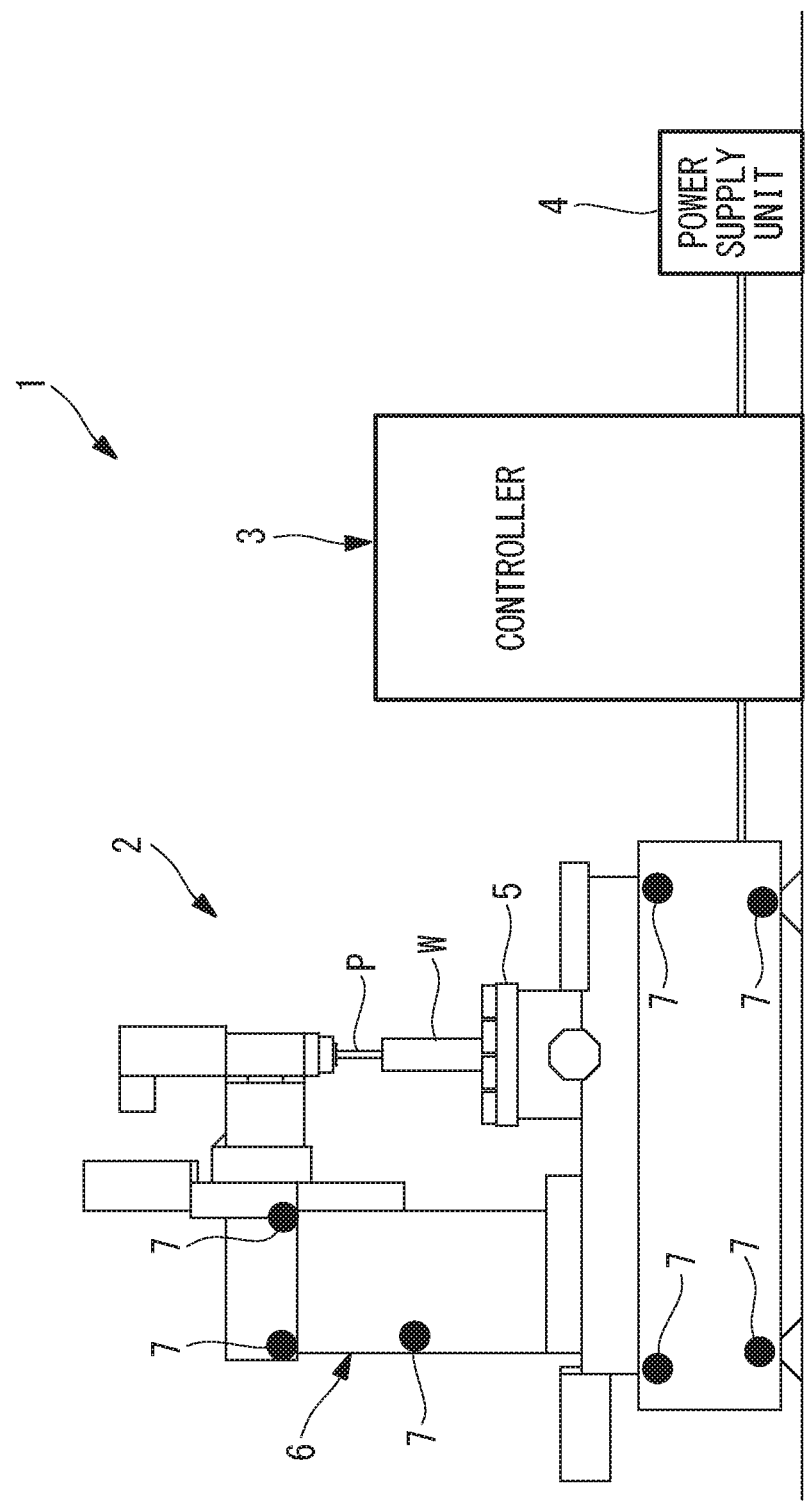
FIG. 1 is an overall diagram illustrating a machine tool system according to an embodiment of the present disclosure.

As illustrated in FIG. 1, the machine tool system 1 of this embodiment is equipped with a machine tool 2 and a controller 3 that controls the machine tool 2. In the drawing, reference sign 4 denotes a power supply unit that supplies power.

The machine tool 2 may be any machine tool, and, for example, is equipped with a machine tool body 6 that processes a workpiece W placed on a stage 5 by operating a tool P. The machine tool 2 is also equipped with multiple temperature sensors 7 that detect the temperatures of the respective parts of the machine tool body 6.

Figure 2:
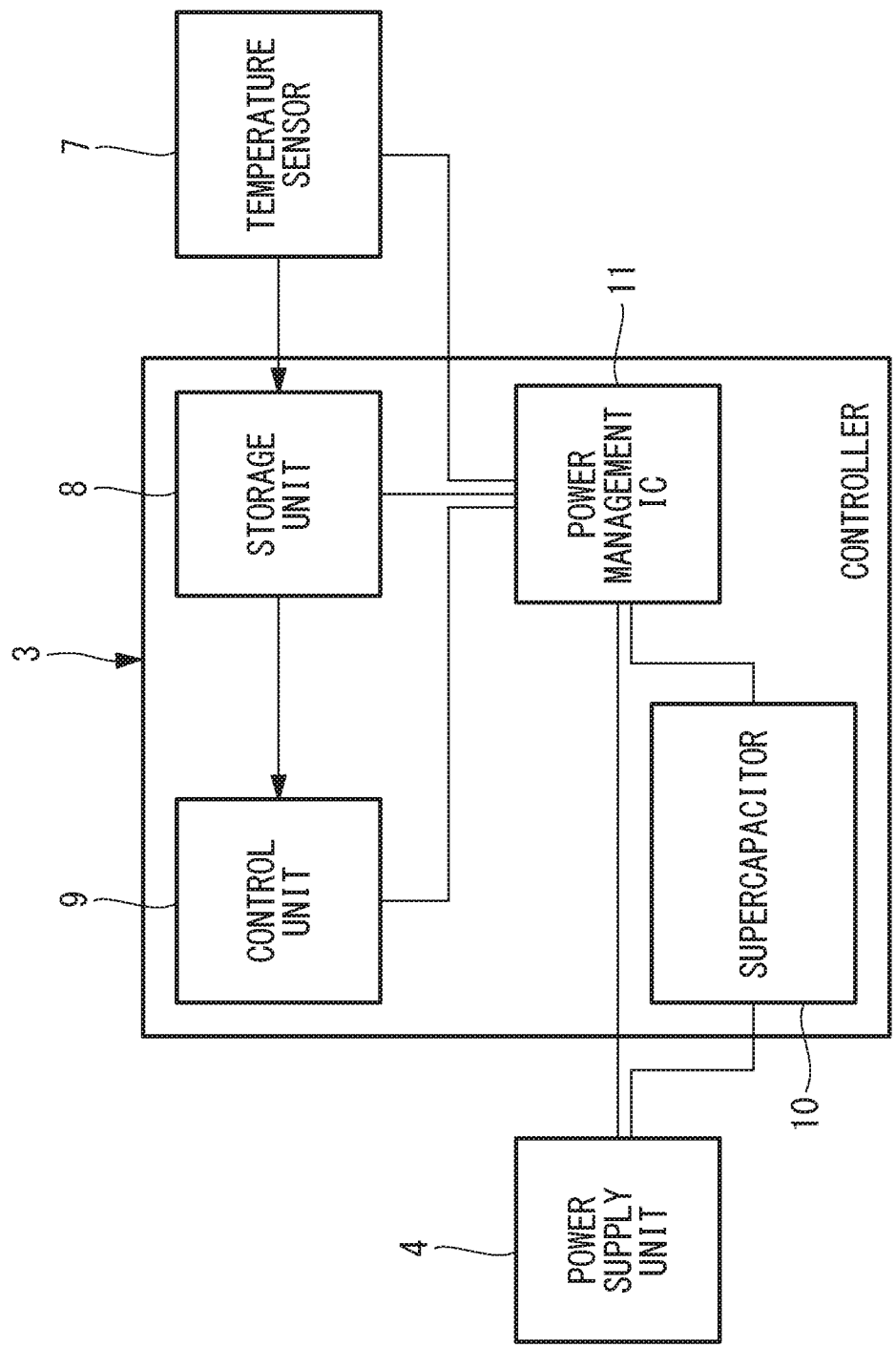
FIG. 2 is a block diagram illustrating a controller of the machine tool system illustrated in FIG. 1.

As illustrated in FIG. 2, the controller 3 is equipped with a storage unit 8 that stores temperature data acquired in time-series by the temperature sensors 7, and a control unit 9 that controls the machine tool body 6 by using the temperature data stored in the storage unit 8. The storage unit 8 is a memory, and the control unit 9 is constituted by a processor and a memory.

The controller 3 is also equipped with a supercapacitor (auxiliary power supply) 10 that is charged by the power supply unit 4 and supplies power when the supply of power from the power supply unit 4 to the machine tool body 6 is stopped. The power supply unit 4 and the supercapacitor 10 are connected to a power management IC 11.

The power management IC 11 manages the supply of power to the temperature sensors 7, the storage unit 8, and the control unit 9. Specifically, when power is supplied from the power supply unit 4, the power management IC 11 charges the supercapacitor 10 while allowing power from the power supply unit 4 to be supplied to the temperature sensors 7, etc. When the supply of power from the power supply unit 4 is cut off, the power management IC 11 switches the power supply so that power from the supercapacitor 10 is supplied to the temperature sensors 7, etc.

The control unit 9 stores a pre-trained model. When the control unit 9 receives an input of the temperature data acquired in a predetermined time range from the storage unit 8, the control unit 9 calculates the positional compensation value for compensating the thermal displacement-induced positional displacement of a feed screw or the like of the machine tool 2. A known method is employed as the method for calculating the positional compensation value.

For example, the positional compensation value at a present time T is calculated by inputting, to the pre-trained model, temperature data from the time $T-\Delta t$, which is the time $\Delta t$ earlier than the present time T, to the present time T.

Figure 3:
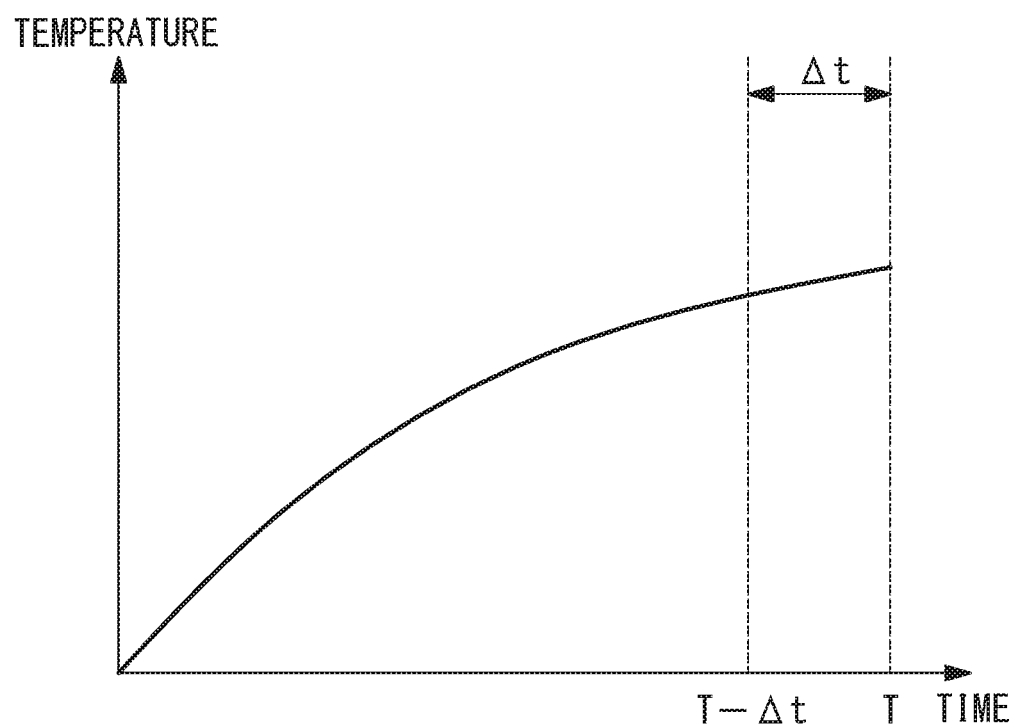
FIG. 3 is a graph showing one example of temperature data over a predetermined time range used in calculating the positional compensation value for the machine tool system illustrated in FIG. 1.
Figure 4:
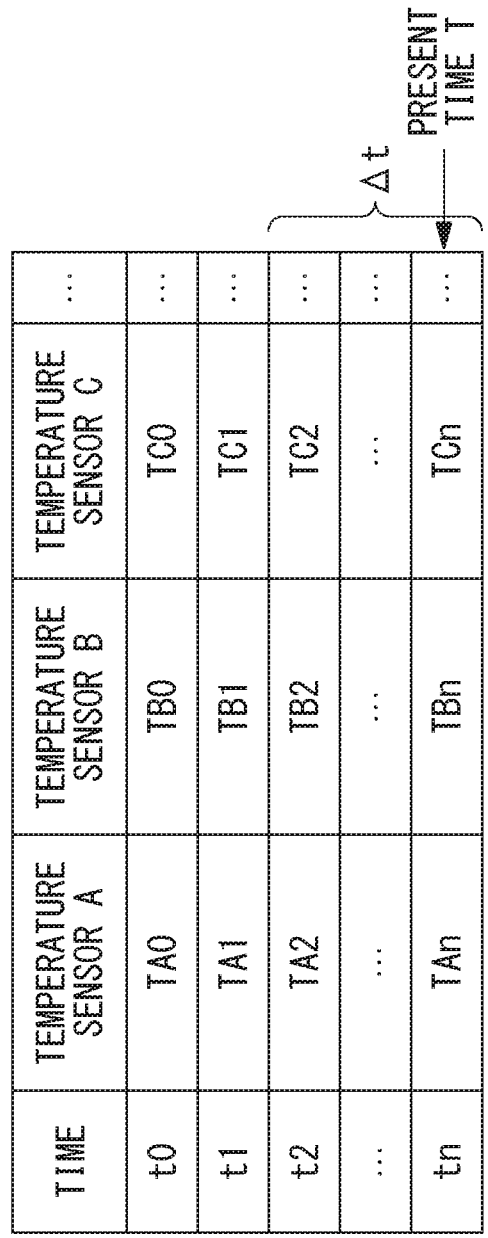
FIG. 4 is a table showing the temperature data shown in FIG. 3.

When power is supplied to the machine tool body 6 to process the workpiece W, the temperatures of the respective parts of the machine tool body 6 detected by the temperature sensors 7 change with time, as illustrated in FIG. 3. Thus, as illustrated in FIG. 4, the control unit 9 stores, in the storage unit 8, time-series temperature data detected by the temperature sensors 7 at time intervals sufficiently smaller than the time range Δt.

For example, when power from the power supply unit 4 is cut off during maintenance or the like of the machine tool body 6, the power management IC 11 switches the source of power to the supercapacitor 10 so that power is continuously supplied to the control unit 9, the temperature sensors 7, and the storage unit 8. Thus, even when the supply of power from the power supply unit 4 is stopped, the temperature data detected by the temperature sensors 7 are stored time-sequentially in the storage unit 8 as long as the supercapacitor 10 is in a charged state.

In this embodiment, when the supply of power from the power supply unit 4 is recovered and processing by the machine tool body 6 is resumed, the control unit 9 determines the thermal displacement compensation value used for controlling the machine tool body 6 as follows.

Figure 5:
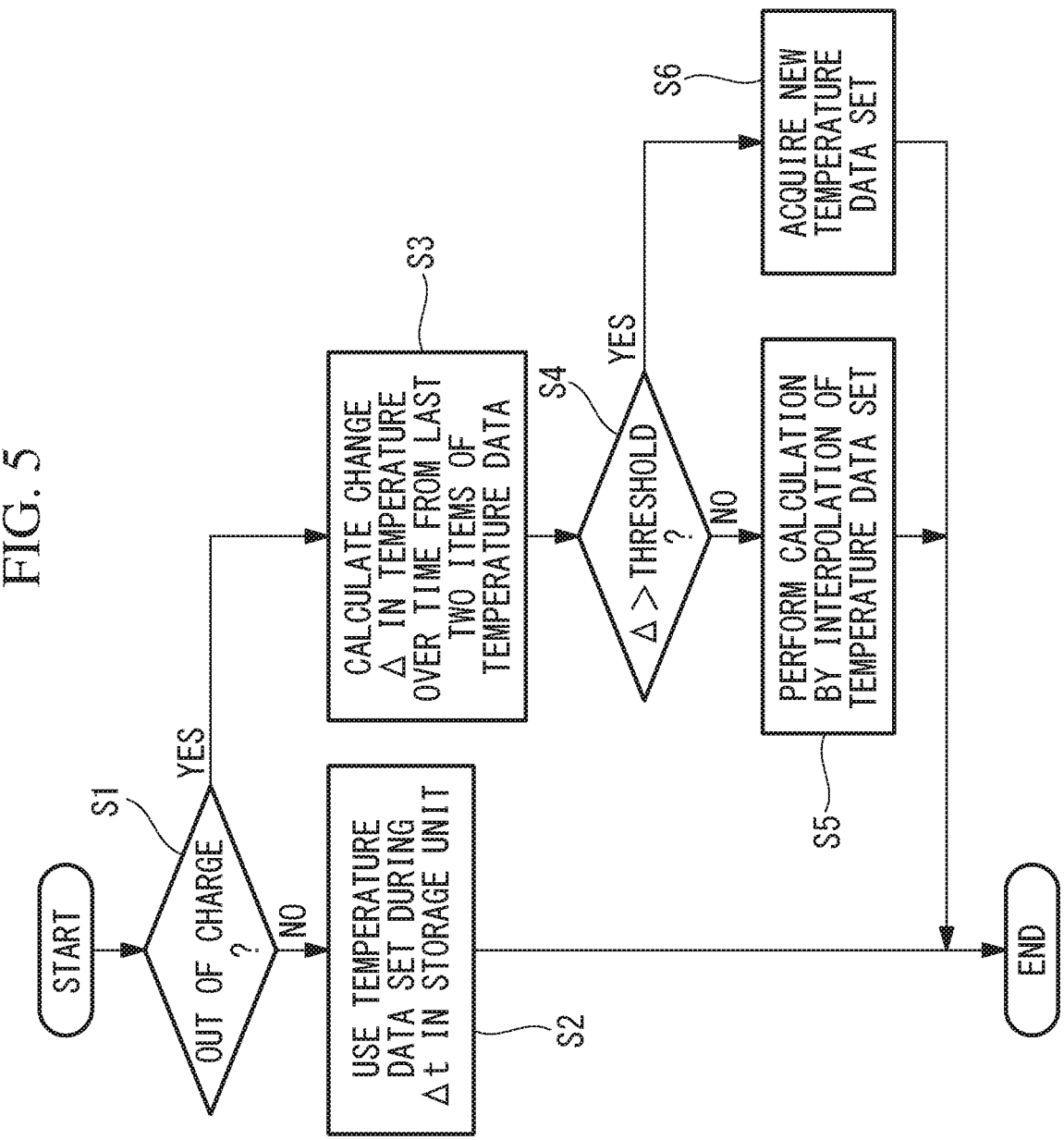
FIG. 5 is a flowchart of the operation of the controller illustrated in FIG. 2.
Figure 6:
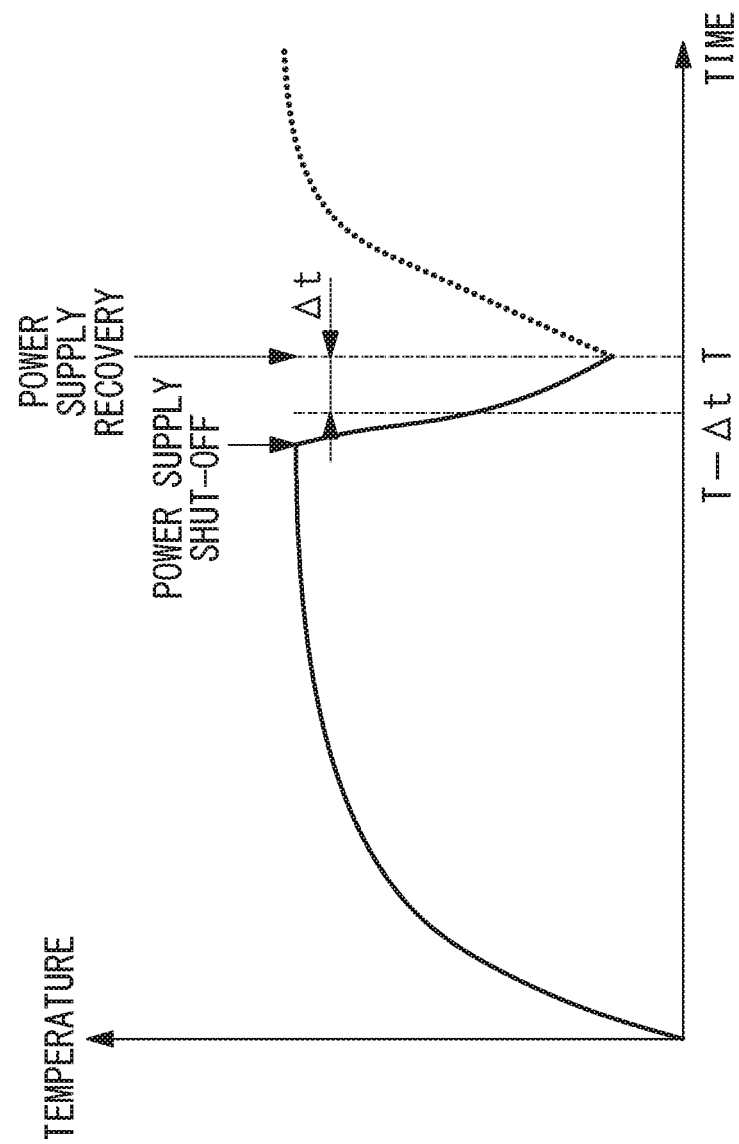
FIG. 6 is a graph illustrating step S2 of the flowchart shown in FIG. 5.

That is, as illustrated in FIG. 5, the control unit 9 first judges whether the supercapacitor 10 is out of charge, that is, whether the charge level is equal to or lower than a predetermined threshold (first threshold) (step S1). If the capacitor is not out of charge, that is, if the charge level is higher than the predetermined threshold, there is no missed temperature data as illustrated in FIG. 6; thus, the temperature data set over the latest time range Δt stored in the storage unit 8 is employed as the temperature data for calculating the positional compensation value (step S2). The standard for determining whether there is a missing part in the temperature data may be that the gap between the time when the temperature data is acquired last and the time when the operation of the machine tool is resumed is a predetermined length or more.

Figure 7:
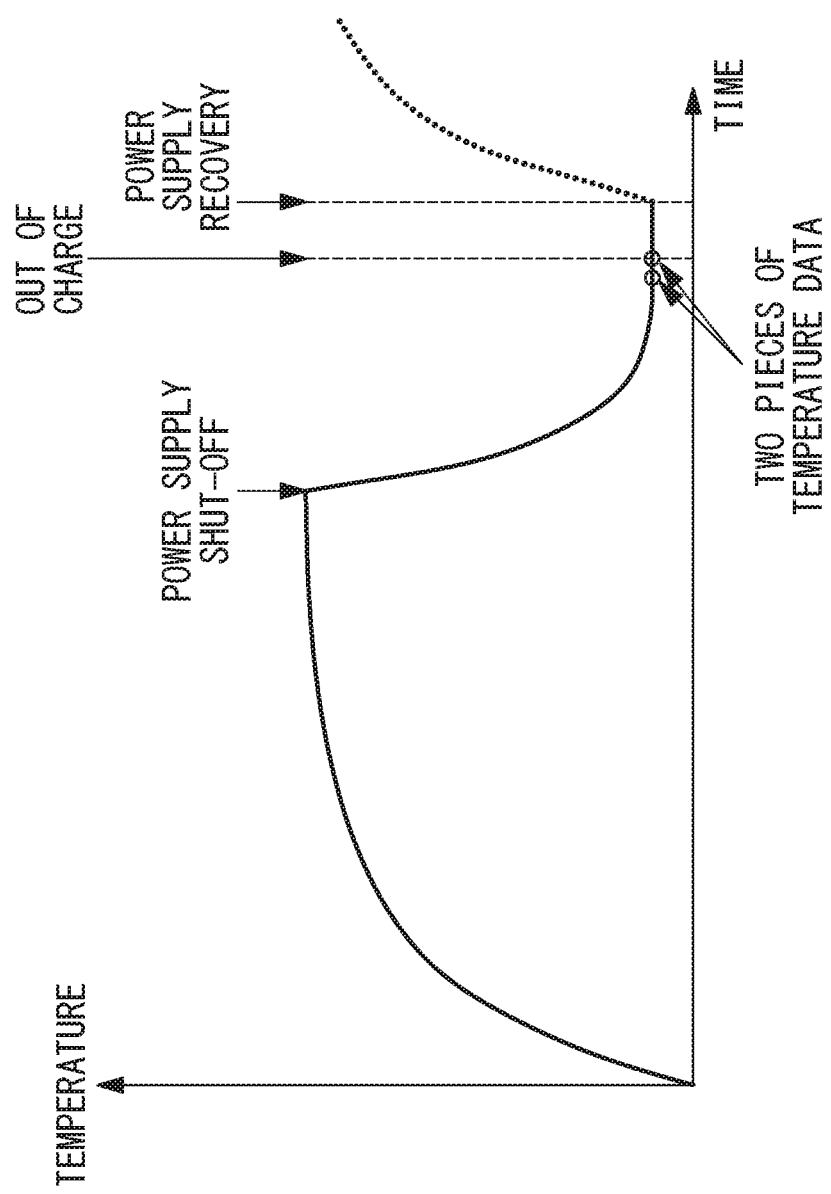
FIG. 7 is a graph illustrating step S5 of the flowchart shown in FIG. 5.

In step S1, when it is judged that the supercapacitor 10 is out of charge, that is, the charge level is equal to or lower than a predetermined threshold, the change Δ in temperature over time is calculated from the last two items of temperature data stored in the storage unit 8 (step S3). However, this change Δ in temperature over time is not limited to what is calculated from two pieces of temperature data; alternatively, a change in temperature per unit time may be calculated by using three or more sets of temperature data. Next, it is judged whether the calculated change Δ in temperature over time is higher than a predetermined threshold (second threshold) for the temperature data detected by all of the temperature sensors 7 (step S4). As illustrated in FIG. 7, when the change Δ in temperature over time is equal to or lower than a predetermined threshold, temperature data in the latest time range Δt is calculated by interpolation by using the temperature data at the time of recovery of the power supply (step S5).

Here, the temperature data at the latest time point stored in the storage unit 8 may be at least one of temperature data stored last in the storage unit 8 before the supercapacitor 10 runs out of charge and temperature data detected first after recovery of the power supply unit 4 and stored in the storage unit 8. In such a case, it is considered that the machine tool 2 is at thermal equilibrium, and thus the temperature data over a predetermined time range Δt can be accurately calculated by interpolation.

Figure 8:
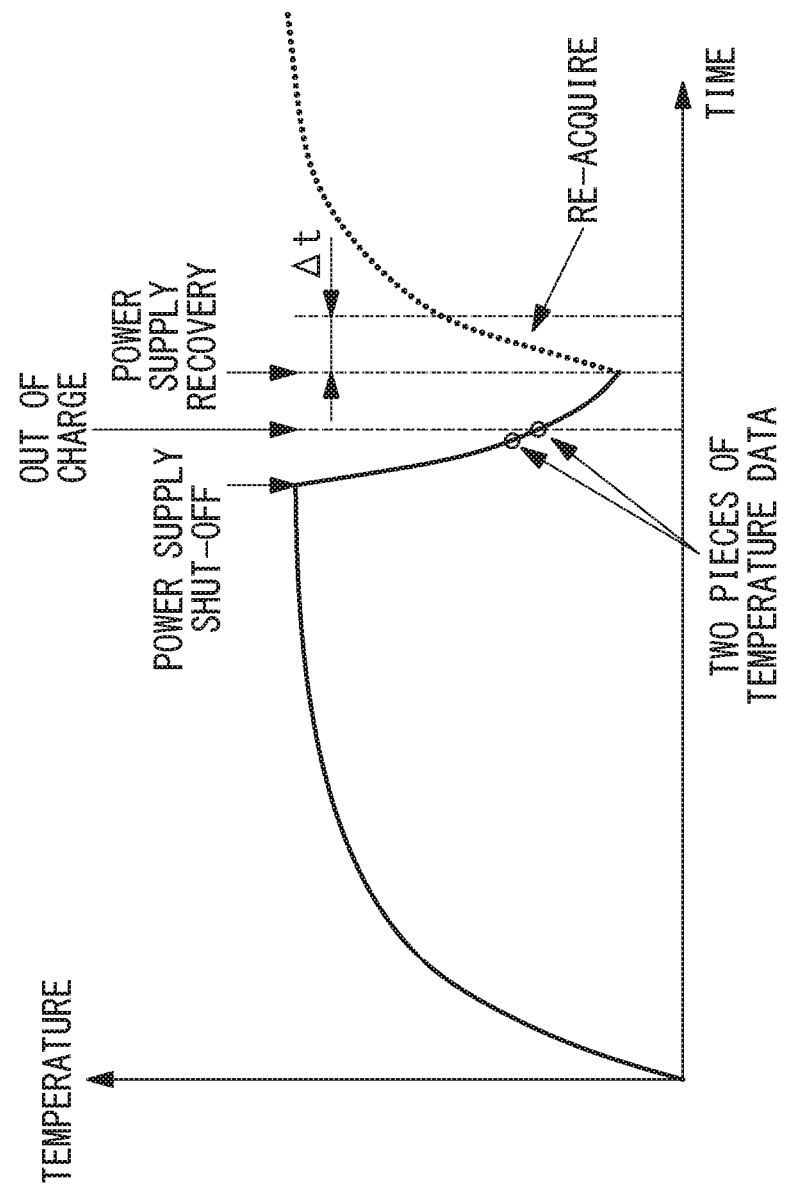
FIG. 8 is a graph illustrating step S6 of the flowchart shown in FIG. 5.

Moreover, as illustrated in FIG. 8, when it is judged that the time change Δ in temperature calculated in step S3 is higher than the predetermined threshold in step S4, temperature data is acquired over the predetermined time range Δt after recovery of the power supply unit 4 without processing the workpiece W (step S6). Alternatively, the operator is notified that warm up operation is needed to newly acquire temperature data over the predetermined time range Δt.

Thus, according to the machine tool system 1 of this embodiment, the thermal displacement compensation value is calculated not by using the temperature data at one point of time but by inputting the temperature data over a predetermined time range Δt into the pre-trained model. In this manner, the positional compensation value can be accurately calculated on the basis of the temperature distribution detected by the temperature sensors 7 installed at multiple positions in the machine tool body 6 and the changes thereof over time.

Moreover, it is possible to keep acquiring temperature data by using an auxiliary power supply such as a supercapacitor 10 as long as the charged state continues. Thus, even when the power supply from the power supply unit 4 is cut off during maintenance or the like, the temperature data over a predetermined time range Δt can continue to be acquired, and thus the positional compensation value can be accurately calculated after the supply of power is resumed.

Moreover, according to the machine tool system 1 of this embodiment, the temperature data used for calculating the thermal displacement compensation value is determined in response to the charge state of the supercapacitor 10 at the time of resuming the operation of the machine tool body 6 by recovery of the power supply unit 4. Thus, there is an advantage in that, even when the supercapacitor 10 is out of charge at the time when the operation of the machine tool body 6 is resumed, the thermal displacement compensation value can be highly accurately calculated by using appropriate temperature data.

In this embodiment, the supercapacitor 10 is described as an example of the auxiliary power supply; alternatively, any other auxiliary power supply that can be charged may be employed.

Moreover, in this embodiment, the control unit 9 stores a pre-trained model and calculates the thermal displacement compensation value from the temperature data over a predetermined time interval; alternatively, an upper-level server connected to the controller 3 via a network may be provided instead. In such a case, the pre-trained model may be stored in the server, and the thermal displacement compensation value may be calculated in the server from the temperature data over the predetermined time interval Δt communicated via the network.

The invention claimed is:

1. A machine tool system comprising:
a machine tool; and
a controller, wherein:
the machine tool is equipped with a machine tool body and at least one temperature sensor that acquires temperature data of the machine tool body,
the controller is equipped with a storage that stores time-series temperature data acquired by the temperature sensor, and an auxiliary power supply that supplies power to the temperature sensor and the storage when supply of power to the machine tool body is stopped,
the controller controls the machine tool by using the temperature data over a predetermined time range stored in the storage, and selects, in response to a charge state of the auxiliary power supply, temperature data to be used in first control after the supply of power to the machine tool body is resumed, and
in a case in which the charge state of the auxiliary power supply is equal to or lower than a first threshold when the supply of power to the machine tool body is resumed and in which a change in the temperature data over a latest predetermined time range stored in the storage is equal to or lower than a second threshold, the controller interpolates temperature data over a predetermined time range by using temperature data at the time of resuming the supply of power.

2. The machine tool system according to claim 1, wherein in a case where the charge state of the auxiliary power supply is higher than the first threshold when the supply of power to the machine tool body is resumed, the controller uses the temperature data over the latest predetermined time range stored in the storage.

3. A machine tool system comprising:
a machine tool; and
a controller, wherein:
the machine tool is equipped with a machine tool body and at least one temperature sensor that acquires temperature data of the machine tool body,
the controller is equipped with a storage that stores time-series temperature data acquired by the temperature sensor, and an auxiliary power supply that supplies power to the temperature sensor and the storage when supply of power to the machine tool body is stopped,
the controller controls the machine tool by using the temperature data over a predetermined time range stored in the storage, and selects, in response to a charge state of the auxiliary power supply, temperature data to be used in first control after the supply of power to the machine tool body is resumed, and
in a case in which the charge state of the auxiliary power supply is equal to or lower than a first threshold when the supply of power to the machine tool body is resumed and in which a change in the temperature data over a latest predetermined time range stored in the storage is higher than a second threshold, the controller acquires the temperature data over a predetermined time range after the supply of power to the machine tool body is resumed, the temperature data capable of being used in the first control.

* * * * *